March 5, 1935. G. W. BOOTH 1,993,254
METHOD OF PREPARING LAMINATED ARTICLES
Filed April 13, 1934
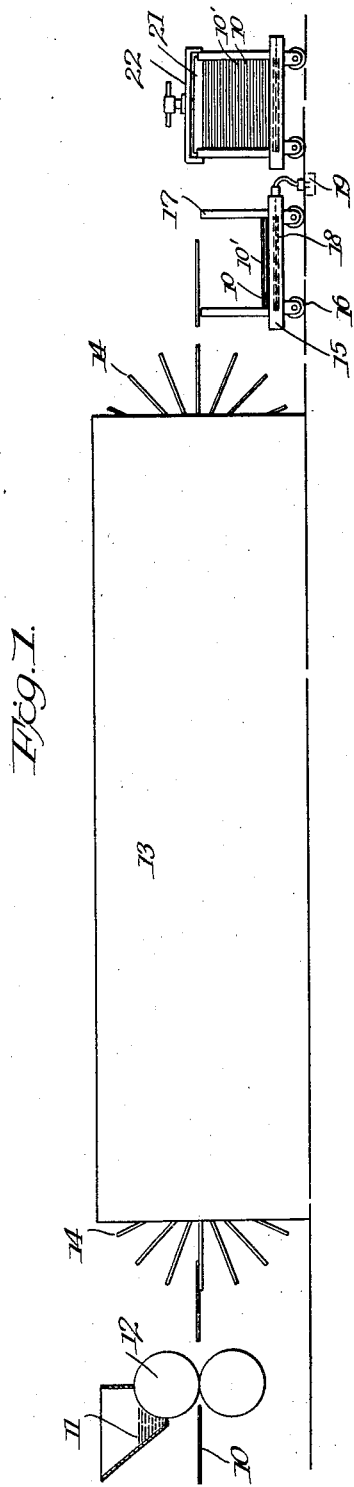
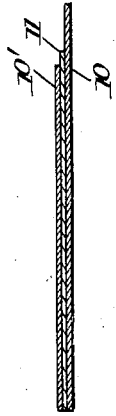
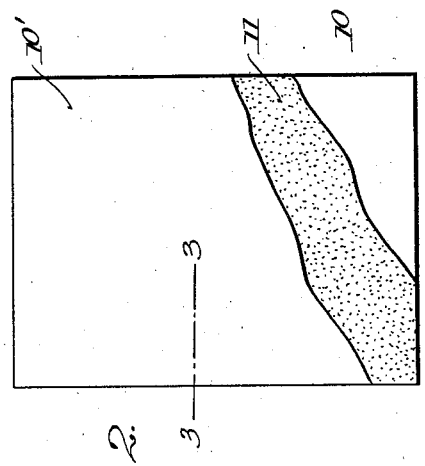
Inventor
George W. Booth,
By Cushman, Darby & Cushman
Attorneys Patented Mar. 5, 1935

1,993,254

UNITED STATES PATENT OFFICE 1,993,254

METHOD OF PREPARING LAMINATED ARTICLE

George W. Booth, Baltimore, Md., assignor to Crown Cork & Seal Company, Inc., Baltimore, Md., a corporation of New York Application April 13, 1934, Serial No. 720,462

15 Claims. (Cl. 154—40)

My invention relates to the manufacture of laminated sheet products, particularly useful in the manufacture of container caps which include a metal shell and a liner.

The principal aim of the invention is to manufacture laminated sheet units having the metal and liner material firmly and continuously adhered. This is important because the sheets are subjected to a punching operation to produce discs which are then formed into complete caps either separately in a suitable apparatus or upon the container by a rolling action.

I have discovered that it is possible to apply a layer of adhesive in flowable condition to metal sheets suitable for cap shells, and in a continuous process, (1) remove the undesirable volatiles from the adhesive layer while reducing the adhesive to an optimum adherent and tacky state, (2) then disposing the adhesive treated sheets in interleaved superposed relation with the other sheets to be combined therewith, (3) during the forming of the stack or pile maintaining the adherent condition of the adhesive, and (4) when the pile has reached the desired height, permitting the adhesive to set while compressing in order to unite the sheets.

One of the principal difficulties in the forming of laminated sheets of this character has been occasioned by the tendency of the adhesive to set prematurely, i. e., chill, requiring a reheating. This causes the bonding material to loose its optimum adhesive characteristics. In the present invention, chilling is avoided and the tacky adhesive condition of the sheets is maintained up to the time of applying the combining pressure. This important result, whereby the liner and metal layers are continuously and firmly bonded, is accomplished by forming the respective interleaved sheets in a stack and providing a heating unit at the base of the stack. Thus, during the forming of the stack up to a desired height, the initial optimum adhesive state of adherency is maintained since the first positioned sheets in the stacking apparatus will be subjected to a longer heating, while successive sheets will be subjected a progressively shorter period and those at the top of the stack will be heated for only a short time or not at all before the uniting pressure is applied. In this manner, chilling is eliminated and the adhesive is constantly kept in the best condition.

Stated briefly, I control the drying of the sheets so that the adhesive does not at any time lose its tacky or adherent condition either during removal of volatiles or the stacking operation. This is important, since at no time is the adhesive permitted to chill and thereby harden or set prior to the application of a combining pressure.

By reason of the present invention, moreover, a multiplicity of laminated units, the layers of which are continuously bonded, are obtainable by a single operation and the units are substantially uniform in characteristics. The time required for setting of the adhesive is relatively short and the stack is preferably formed on a mobile carrier which may be positioned adjacent the drying ovens to receive the respective sheets and upon application of the combining pressure, the carriage may be moved away and subjected to any desired temperature and atmosphere for accomplishing more rapid setting of the adhesive, or moved to that part of the plant where the punching or stamping operation is to be completed and the setting and hardening of the adhesive accomplished there.

The manufacturing advantages of this method of procedure are highly satisfactory, not only in assuring that an efficient product will be obtained, but also in allowing a continuous steady supply of the laminated units to be made available for the punching machines.

In the drawing,

Figure 1 is a diagrammatic view showing my improved method of producing laminated sheets;

Figure 2 is a top elevation with the corner of the sheet broken away showing the adhesive and material layers; and Figure 3 is a sectional view on the line 3—3 of Figure 2.

In carrying out the present invention, a sheet of metal such as tin plate or black plate or suitable strip material 10, is coated coextensively or throughout its area with a suitable flowable adhesive lacquer or varnish 11 by means of coating rollers 12. I do not care to be limited to the particular type of lacquer, varnish, or other adhesive coating which may be applied to the sheets since there are numerous varieties of these available, all of which are satisfactory. Preferably, however, the adhesive is one which is flowable, is susceptible of being conditioned to a tacky and adhesive state with release of undesirable volatiles, i. e., those which produce objectionable odors or off-flavors, and which adhesive can be maintained in its adherent tacky condition by a suitable heating. In other words, I employ a heat fusible adhesive which is applied in flowable condition from which volatiles which might produce objectionable odors or tastes are removable during the conditioning treatment of the adhesive to concentrate or dry the same and cause it to assume an optimum adhesive and tacky state.

The sheets 10, after the coating, are conditioned in the heating oven or treating chamber 13, whence the volatiles are removed, the sheets being fed at one end of the oven to a suitable continuous conveyor and carried thereby through the oven and removed from the oven at the opposite end with the adhesive in tacky adherent state and free of undesired volatiles. Preferably, the adhesive 11 is applied to one side only of the sheets or strips 10, but, of course, both surfaces may be coated with the adhesive, dependent upon the units which are to be made. In the case of caps, having a metal shell and a liner, the adhesive will be fixed to only one side of the metal sheet. The metal sheets, as removed from the conditioning or drying chamber 13 having the adhesive layer in tacky adherent condition thereon, are positioned in a suitable jig 15 with the adhesive surface upward. This jig can be mobile, having rollers 16, and is also provided with suitable uprights or guides 17 for supporting the sheets in the jig and retaining them in position to form a stack or pile. A suitable heating element 18, preferably of the electrical resistance type, is disposed in the base of the jig as shown and suitably connected to a source of electricity 19.

The sheet having the adhesive tacky surface and positioned in the jig with its adhesive surface upward, forms the base of the stack 20 of laminated units. That is to say, the sheets may be automatically removed from the chamber 13 and positioned in the jig and a suitable coextensive layer 10' of sheet material to be combined with the first sheet and free of adhesive, positioned upon the adhesive surface of each metal sheet. For example, the metal adhesive coated sheets 10 are continuously removed from the treating chamber 13 and positioned in the jig and upon the adhesive surface of each sheet 10 is superposed a coextensive sheet 10' which is to be combined with the metal sheet and form the laminated unit. In this manner, a stack of desired height is produced. During the forming of the stack, I have found that the adhesive layers can be retained in their initial optimum adhesive condition, i. e., as removed from the oven by heating the same through the medium of the heating element 18. This element, being disposed in the base of the jig, will exert the longest heating effect upon the adhesive layers which, of necessity, remain longest in the jig, and the heating period will progressively reduce as to time and intensity as regards the superposed adhesive layers until the stack reaches the required height. In this manner, chilling or setting of the adhesive prematurely is overcome. Again, the adhesive layers are preserved in a state to exert substantially equal adhesive characteristics due to the temperature control of heating element 18. As soon as a stack of desired height is produced, a plate 21 is positioned over the top of the stack and pressed down thereon by means of the screw 22; the heating element 18 is then disconnected. The pressure exerted by the screw 22 upon the plate 21 will serve to combine the adhesive coated and non-adhesive coated sheets into laminated units of the type shown in Figures 2 and 3. When the combining action is completed, the screw 22 and plate 21 are raised and the units in separable condition are available.

The removal of the sheets 10 from the oven and their depositing in the jig may be accomplished automatically and the feeding and depositing of the sheets 10' may likewise be operated automatically, suitable timing mechanism being utilized with the automatic apparatus to assure the proper interleaving and positioning of the sheets.

By means of the method described, I will manufacture laminated units consisting of a metal sheet 10 and a superposed layer or liner material 10' such as paper. However, the method may be practiced so that there will be combined with the metal layer 10 a coextensive layer 10' of any suitable metal or fibrous material. For example, two metal sheets 10 may be joined or metal sheets of a different character and gauge may be combined. Thus the sheet 10 may be of tin plate and the sheet 10' of aluminum, aluminum foil, tin foil, or a laminated aluminum sheet or foil. Again, the sheet 10' may be of paper or paper-like materials, natural cork, or cork composition. These various materials may be combined with the base layer of tin plate or may be combined with one another, as two paper layers, paper and cork layers, etc.

It will be understood that as soon as the stack of the desired height is produced and the combining pressure applied, the jig may be moved to a position where conditions accelerating the setting of the adhesive are available. For example, the jig may be positioned in a suitable chamber where the temperature and atmospheric conditions will promote a rapid setting of the adhesive. On the other hand, this is not essential and the jig may simply be positioned anywhere in the plant where the temperature conditions are such that the adhesive will harden and set. Thus, the jig may be moved to a point adjacent the punching and stamping machinery, so that within a very short time period, possibly twenty or thirty minutes, the sheets will be available.

By reason of the present invention, the bonding of the respective layers is continuous, that is the coextensive layers are bonded to each other throughout their respective areas. Hence, the sheets may be stamped or punched in suitable machinery to form cap discs or blanks without causing any loosening of the liner from the metal layer, and such discs may be formed in a suitable apparatus into the cap or rolled upon a bottle neck to produce the closure without disturbing the bonding association of the metal and liner. The importance, therefore, of having a continuously bonded laminated product will be appreciated and the present invention has proven satisfactory for combining various of the materials herein referred to. Under the stamping and forming operations these materials have withstood the strenuous conditions without producing any destruction of the bond and the caps produced are of uniform quality.

I claim:

1. The method of preparing laminated sheet products which comprises applying an adhesive layer to the surface of each of a plurality of sheets, treating the adhesive coated sheets to release undesired volatiles and condition the adhesive in adherent tacky state, continuously depositing the sheets having the adhesive in tacky condition in interleaved association with other sheets to be united to the surfaces of the first mentioned sheets by the adhesive layer and forming a stack, controlling the temperature during formation of the stack of interleaved sheets so as to maintain substantially the initial adhesive and tacky condition of said adhesive layers until a stack of desired height is formed, discontinuing such temperature control, and compressing the stack and allowing the adhesive to set to unite the sheets.

2. The method of preparing laminated sheet products which comprises applying an adhesive layer to one surface of each of a plurality of sheets, treating the adhesive coated surfaces to remove undesirable volatiles and rendering the adhesive adherent and in tacky state, continuously depositing the sheets having the adhesive in tacky condition in interleaved association with other sheets free of adhesive which are to be united to the surfaces of the first mentioned sheets by the adhesive layer and forming a stack, controlling the temperature during formation of the stack of interleaved sheets so as to maintain substantially the initial adhesive and tacky condition of said adhesive layers until a stack of desired height is formed, discontinuing such temperature control, and compressing the stack and allowing the adhesive to set to unite the sheets into a plurality of separable laminated units.

3. The method of preparing laminated products which comprises applying an adhesive layer to one surface of each of a plurality of sheets, treating the adhesive coated surfaces to remove undesirable volatiles and render the adhesive in adherent tacky condition and capable of setting in the absence of heat, continuously depositing the sheets having the adhesive in tacky condition in interleaved association with other sheets free of adhesive which are to be united to the surfaces of the first mentioned sheets by the adhesive layer and forming a stack, preventing chilling and setting of the adhesive during formation of the stack of interleaved sheets so as to maintain substantially the initial adhesive and tacky condition of said adhesive layers until a stack of desired height is formed, and compressing the stack to unite the sheets under conditions permitting the adhesive to set and unite the sheets.

4. The method of preparing laminated sheet products which comprises applying a layer of heat fusible adhesive to the surface of each of a plurality of sheets, treating the adhesive coated sheets to release undesired volatiles and condition the adhesive in adherent tacky state, continuously depositing the sheets having the adhesive in tacky condition in interleaved association with other sheets to be united to the surfaces of the first mentioned sheets by the adhesive layer and forming a stack, controlling the temperature during formation of the stack of interleaved sheets so as to maintain substantially the initial adhesive and tacky condition of said adhesive layers until a stack of desired height is formed, discontinuing such temperature control, and compressing the stack and allowing the adhesive to set to unite the sheets.

5. The method of preparing laminated sheet products which comprises applying a layer of heat fusible adhesive to one surface of each of a plurality of sheets, treating the adhesive coated surfaces to remove undesirable volatiles and rendering the adhesive adherent and in tacky state, continuously depositing the sheets having the adhesive in tacky condition in interleaved association with other sheets free of adhesive which are to be united to the surfaces of the first mentioned sheets by the adhesive layer and forming a stack, controlling the temperature during formation of the stack of interleaved sheets so as to maintain substantially the initial adhesive and tacky condition of said adhesive layers until a stack of desired height is formed, discontinuing such temperature control, and compressing the stack and allowing the adhesive to set to unite the sheets into a plurality of separable laminated units.

6. The method of preparing laminated products which comprises applying a layer of heat fusible adhesive to one surface of each of a plurality of sheets, treating the adhesive coated surfaces to remove undesirable volatiles and render the adhesive in adherent tacky condition and capable of setting in the absence of heat, continuously depositing the sheets having the adhesive in tacky condition in interleaved association with other sheets free of adhesive which are to be united to the surfaces of the first mentioned sheets by the adhesive layer and forming a stack, preventing chilling and setting of the adhesive during formation of the stack of interleaved sheets so as to maintain substantially the initial adhesive and tacky condition of said adhesive layers until a stack of desired height is formed, and compressing the stack to unite the sheets under conditions permitting the adhesive to set and unite the sheets.

7. The method of preparing laminated sheet products which comprises applying an adhesive layer to the surface of each of a plurality of sheets, treating the adhesive coated sheets to release undesired volatiles and condition the adhesive in adherent tacky state, continuously depositing the sheets having the adhesive in tacky condition in interleaved association with other sheets to be united to the surfaces of the first mentioned sheets by the adhesive layer and forming a stack, heating the stack during its formation at a temperature to maintain the adhesive layers in tacky, adhesive state until a stack of desired height is formed, discontinuing such temperature control, and compressing the stack and allowing the adhesive to set to unite the sheets.

8. The method of preparing laminated sheet products which comprises applying an adhesive layer to one surface of each of a plurality of sheets, treating the adhesive coated surfaces to remove undesirable volatiles and rendering the adhesive adherent and in tacky state, continuously depositing the sheets having the adhesive in tacky condition in interleaved association with other sheets which are free of adhesive to be united to the surfaces of the first mentioned sheets by the adhesive layer and forming a stack, heating the stack at or adjacent the bottom thereof during its formation at a temperature to maintain the adhesive layer in adhesive and tacky state until a stack of desired height is formed, discontinuing such temperature control, and compressing the stack and allowing the adhesive to set to unite the sheets into a plurality of separable laminated units.

9. The method of preparing laminated products which comprises applying an adhesive layer to one surface of each of a plurality of sheets, treating the adhesive coated surfaces to remove undesirable volatiles and render the adhesive in adherent tacky condition and capable of setting in the absence of heat, continuously depositing the sheets having the adhesive in tacky condition in interleaved association with other sheets which are free of adhesive to be united to the surfaces of the first mentioned sheets by the adhesive layer and forming a stack, heating the stack from the bottom thereof during formation to maintain the adhesive layers constantly in adhesive and tacky state until a stack of desired height is formed and at a temperature to render the adhesive layers of substantially equal and uniform adherent characteristics, and compressing the stack to unite the sheets under conditions permitting the adhesive to set and adhesively unite the sheets.

10. The method of preparing laminated sheet products which comprises applying an adhesive layer to the surface of each of a plurality of metal sheets, treating the adhesive coated sheets to release undesired volatiles and condition the adhesive in adherent tacky state, continuously depositing the sheets having the adhesive in tacky condition in interleaved association with sheets of fibrous material to be united to the surfaces of the first mentioned sheets by the adhesive layer and forming a stack, controlling the temperature during formation of the stack of interleaved sheets so as to substantially maintain the initial adhesive and tacky condition of said adhesive layers until a stack of desired height is formed, discontinuing such temperature control, and compressing the stack and allowing the adhesive to set to unite the sheets.

11. The method of preparing laminated sheet products which comprises applying an adhesive layer to the surface of each of a plurality of metal sheets, treating the adhesive coated sheets to release undesired volatiles and condition the adhesive in adherent tacky state, continuously depositing the sheets having the adhesive in tacky condition in interleaved association with other metal sheets to be united to the surfaces of the first mentioned sheets by the adhesive layer and forming a stack, controlling the temperature during formation of the stack of interleaved sheets so as to substantially maintain the initial adhesive and tacky condition of said adhesive layers until a stack of desired height is formed, discontinuing such temperature control, and compressing the stack and allowing the adhesive to set to unite the sheets.

12. The method of preparing laminated sheet products which comprises applying an adhesive layer to the surface of each of a plurality of metal sheets, treating the adhesive coated sheets to release undesired volatiles and condition the adhesive in adherent tacky state, continuously depositing the sheets having the adhesive in tacky condition in interleaved association with paper-like sheets to be united to the surfaces of the first mentioned sheets by the adhesive layer and forming a stack, controlling the temperature during formation of the stack of interleaved sheets so as to substantially maintain the initial adhesive and tacky condition of said adhesive layers until a stack of desired height is formed, discontinuing such temperature control, and compressing the stack and allowing the adhesive to set to unite the sheets.

13. The method of preparing laminated sheet products which comprises applying an adhesive layer to the surface of each of a plurality of metal sheets, treating the adhesive coated sheets to release undesired volatiles and condition the adhesive in adherent tacky state, continuously depositing the sheets having the adhesive in tacky condition in interleaved association with sheets of natural cork or cork composition to be united to the surfaces of the first mentioned sheets by the adhesive layer and forming a stack, controlling the temperature during formation of the stack of interleaved sheets so as to substantially maintain the initial adhesive and tacky condition of said adhesive layers until a stack of desired height is formed, discontinuing such temperature control, and compressing the stack and allowing the adhesive to set to unite the sheets.

14. The method of preparing laminated sheet products which comprises applying an adhesive layer to the surface of each of a plurality of metal sheets, treating the adhesive coated sheets to release undesired volatiles and condition the adhesive in adherent tacky state, continuously depositing the sheets having the adhesive in tacky condition in interleaved association with sheets of metal foil to be united to the surfaces of the first mentioned sheets by the adhesive layer and forming a stack, controlling the temperature during formation of the stack of interleaved sheets so as to substantially maintain the initial adhesive and tacky condition of said adhesive layers until a stack of desired height is formed, discontinuing such temperature control, and compressing the stack and allowing the adhesive to set to unite the sheets.

15. The method of preparing laminated products which comprises applying an adhesive layer to one surface of each of a plurality of sheets, treating the adhesive coated surfaces to remove undesirable volatiles and render the adhesive in adherent tacky condition and capable of setting in the absence of heat, continuously depositing the sheets having the adhesive in tacky condition in interleaved association with other sheets free of adhesive which are to be united to the surfaces of the first mentioned sheets by the adhesive layer and forming a stack, maintaining substantially the initial adhesive and tacky condition of said adhesive layers during the forming of the stack, and compressing the stack to unite the sheets under conditions permitting the adhesive to set and unite the sheets.

GEORGE W. BOOTH